United States Patent [19]

Bernard et al.

[11] Patent Number: 5,702,844
[45] Date of Patent: Dec. 30, 1997

[54] NICKEL ELECTRODE FOR AN ALKALINE STORAGE CELL

[75] Inventors: Patrick Bernard, Massy; André Lecerf, Pace; Stéphane Senyarich, Combs la Ville; Claudette Audry, Massy, all of France

[73] Assignee: SAFT, Romainville, France

[21] Appl. No.: 609,388

[22] Filed: Mar. 1, 1996

[30] Foreign Application Priority Data

Mar. 3, 1995 [FR] France .................. 95 02504

[51] Int. Cl.$^6$ ................ H01M 4/32; H01M 4/36; H01M 4/56
[52] U.S. Cl. ............... 429/223; 429/206; 429/235; 429/236; 429/237
[58] Field of Search ............... 204/284; 429/223, 429/235, 236, 237

[56] References Cited

U.S. PATENT DOCUMENTS 5,384,216  1/1995  Teraoka et al. ............... 429/223

FOREIGN PATENT DOCUMENTS

| 0353837A1 | 2/1990 | European Pat. Off. . |
| 0390677A1 | 10/1990 | European Pat. Off. . |
| 390 677 | 10/1990 | European Pat. Off. . |
| 4239295A1 | 5/1994 | Germany . |
| 4429273A1 | 2/1995 | Germany . |

OTHER PUBLICATIONS

B.C. Cornilsen et al, "Structural Comparison of Nickel Electrodes and Precursor Phases", *Journal of Power Sources*, vol. 29, No. 3/4 Feb. 1990, Lausanne, CH, pp. 453–466.

*Patent Abstracts of Japan*, vol. 17, No. 334 (E–1387) 24 Jun. 1993 corresponding to JP-A-05 041 213 (Sanyo Electric Co.) Feb. 19, 1993.

*Patent Abstracts of Japan*, vol. 17, No. 209 (E–1355) 3 Apr. 1993 corresponding to JP-A-04 349 353 (Yuasa Battery Co., Ltd) Dec. 3, 1992.

*Patent Abstracts of Japan*, vol. 17, No. 173 (E–1345) 17 Nov. 1992 corresponding to JP-A-04 328 257 (Toshiba Battery Co., Ltd.) Nov. 17, 1992.

*Patent Abstracts of Japan*, vol. 18, No. 77 (E–1504) 5 Nov. 1993 corresponding to JP-A-05 290 841 (Hitachi Maxell Ltd.) Nov. 5, 1993.

*Patent Abstracts of Japan*, vol. 15, No. 9 (E–1021) 9 Jan. 1991 corresponding to JP-A-02 262 245 (Japan Storage Battery Co., Ltd.) Oct. 25, 1990.

*Patent Abstracts of Japan*, vol. 12, No. 106 (E–596) (2953) 6 Apr. 1988 corresponding to JP-A-62 234 867 (Yuasa Battery Co., Ltd) Oct. 15, 1987.

*Database WPI*, Derwent Publications, Ltd., London, GB; AN 90–054055 corresponding to JP-A-2 006 340 (Kansai Shokubai Kag).

*Database WPI*, Derwent Publications td., London, GB; AN 86–033241 corresponding to JP-A-60 255 632 (Sumitomo Metal Mini KK).

Armstrong et al., "Some Effects of Cobalt Hydroxide Upon the Electrochemical Behaviour of Nickel Hydroxide Electrodes", J. of Power Sources, 25(2), pp. 89–97, 1989.

*Primary Examiner*—Kathryn L. Gorgos
*Assistant Examiner*—Edna Wong
*Attorney, Agent, or Firm*—Sughrue, Mion, Zinn, Macpeak & Seas, PLLC

[57] ABSTRACT

The present invention concerns a nickel electrode comprising a nickel-based hydroxide which satisfies at least one of the following criteria:

an intensity ratio of the [103] line to the [200] line in the X-ray diffraction diagram of 1.05±0.10;

a coherence length L of 13±3 nm, a ratio of the sum of the surface areas of the peaks at 3687±10 cm$^{-1}$ and 3600±10 cm$^{-1}$ to the surface area of the peak at 3580±10 cm$^{-1}$ of the Raman spectrum of 0.11±0.03;

a ratio of the surface area of the peak at 511±10 cm$^{-1}$ to the surface area of the peak at 460±10 cm$^{-1}$ in the Raman spectrum of 1.1±0.1.

12 Claims, 7 Drawing Sheets

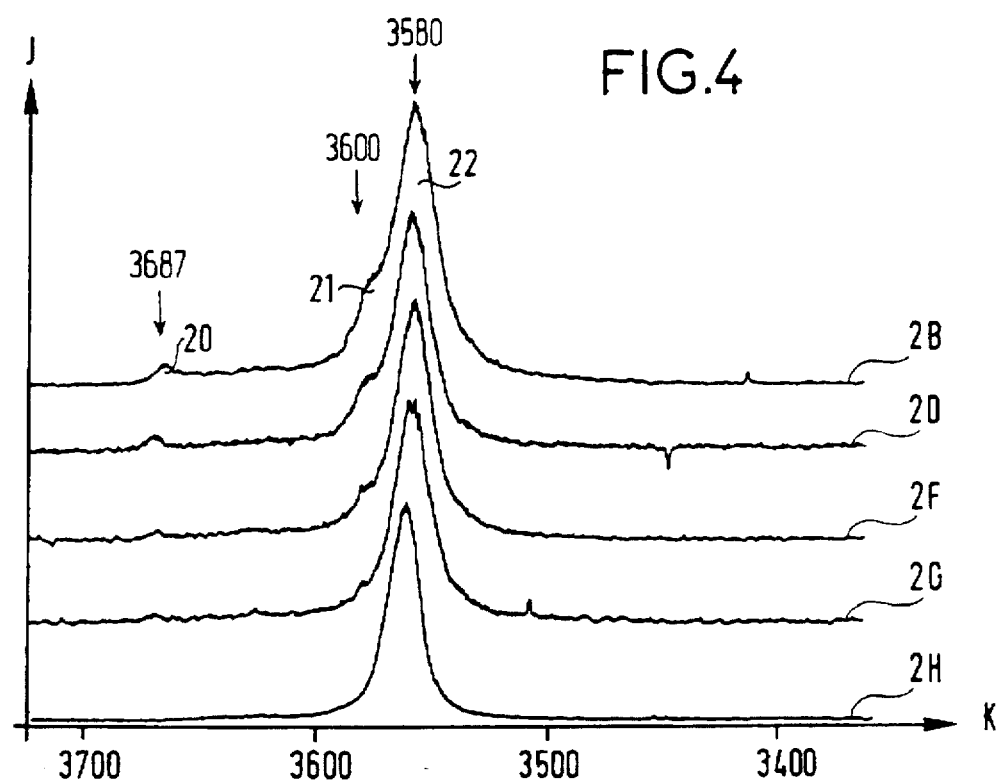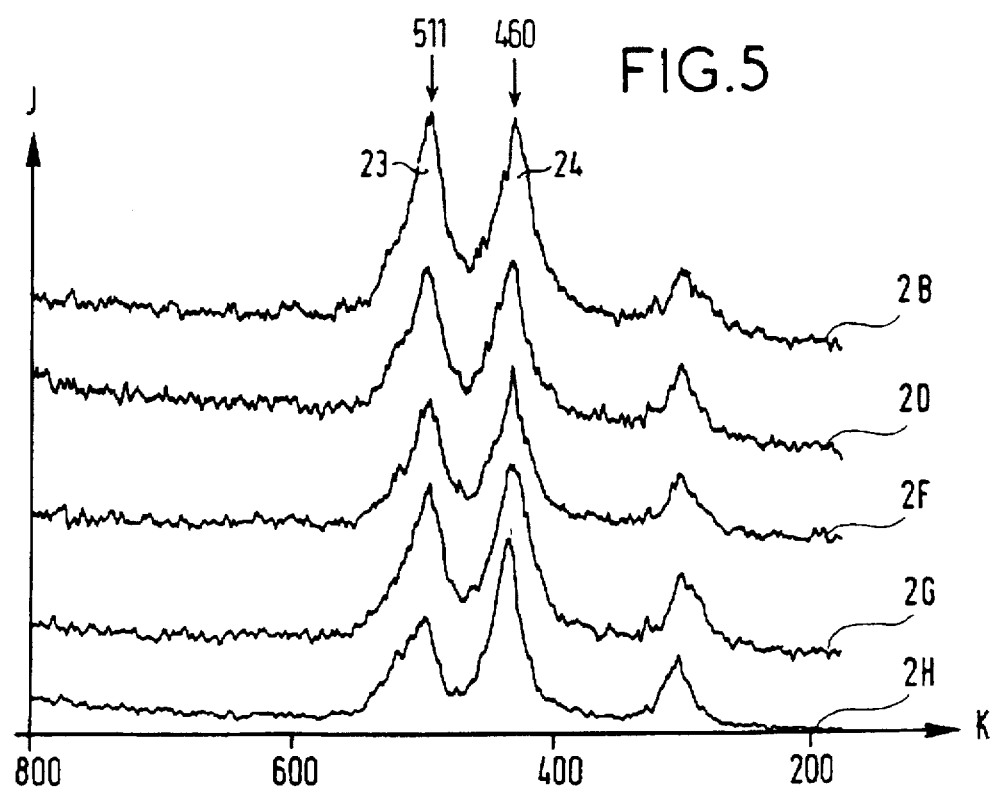

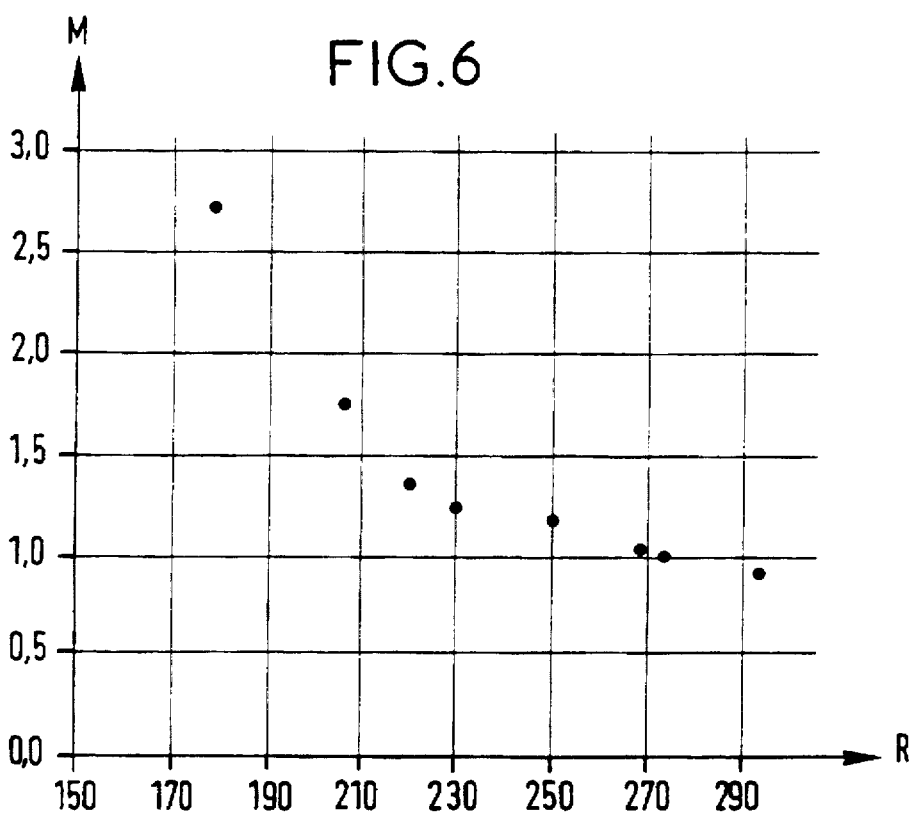
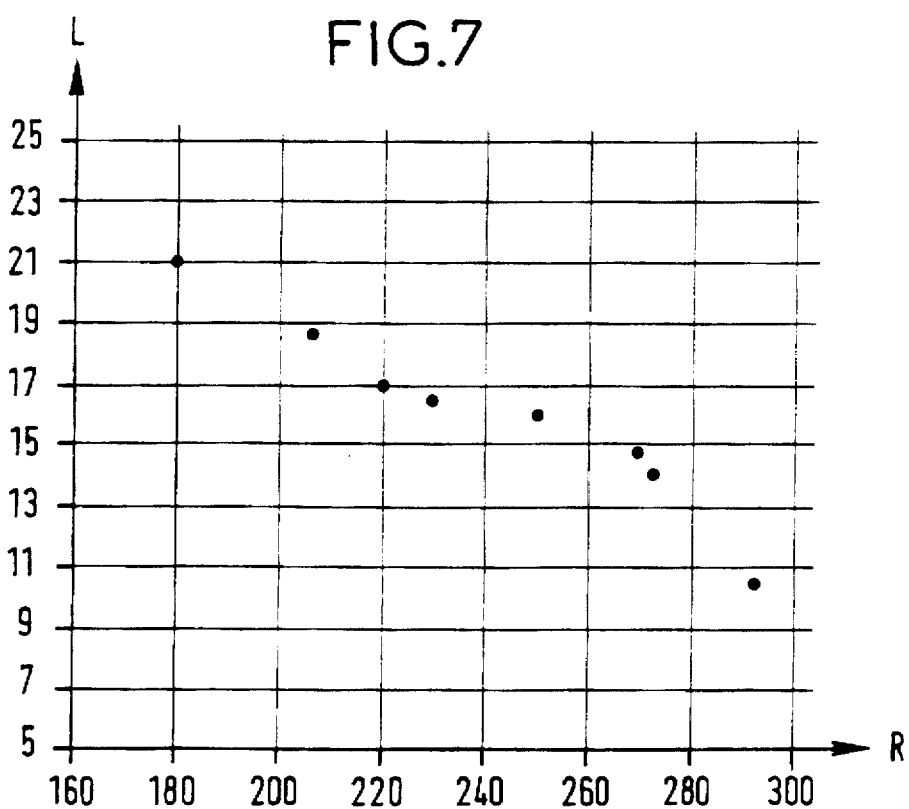

NICKEL ELECTRODE FOR AN ALKALINE STORAGE CELL

FIELD OF THE INVENTION

The present invention concerns a nickel electrode with a non-sintered support for a storage cell containing an alkaline electrolyte, for example nickel-cadmium Ni—Cd or nickel-metal hydride Ni—MH, more particularly the active material for use in such an electrode.

BACKGROUND OF THE INVENTION

Until recently, all alkaline electrolyte storage cells have contained a nickel electrode with a sintered support and with the active material being electro-chemically or chemically deposited in the pores of the support by means of a number of successive precipitation operations. That method of manufacture, however, is lengthy and expensive. In order to satisfy increasing user demand, those electrodes can now be manufactured differently. A nickel electrode with a non-sintered support consists of a porous three-dimensional conductive structure such as a metal or carbonaceous sponge or felt, into which a paste containing the active material is introduced. The paste normally contains a nickel-based hydroxide and a conductive powder composed, for example, of cobalt compounds such as cobalt metal, a cobalt hydroxide and/or a cobalt oxide, all in combination with a binder.

Chemical precipitation produces a monophase $\beta$-Ni(OH)$_2$ type nickel hydroxide which crystallizes as a hexagonal lattice with the following lattice parameters: a=0.31 nanometers (nm) and c=0.46 nm. It is constituted by a stack of Ni(OH)$_2$ sheets. The nickel hydroxide crystallites are generally in the form of hexagonal platelets. The nickel hydroxide may contain a minor proportion of one or more other syncrystallized metals which do not modify the crystalline structure of the hydroxide.

With a nickel hydroxide-based positive electrode, the structural modifications occurring during electrochemical cycling have been clarified by Bode et al. (Electrochemica Acta, 11 (1966) 1079) using a diagram using the $\alpha^{II}$, $\beta^{II}$, $\beta^{III}$ and $\gamma^{III}$ phases whose structure is well known to crystallographers:

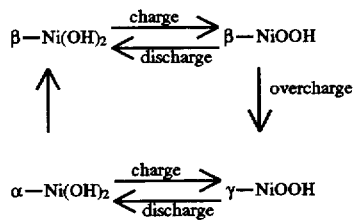

While the reaction caused during cycling under moderate service conditions consists of the majority of the $\beta$-Ni(OH)$_2$ hydroxide transforming into the $\beta$-NiOOH oxyhydroxide by simple deprotonation, other structural modifications can occur. Thus the skilled person is aware that transformation of the $\beta$-NiOOH oxyhydroxide to the $\gamma$-NiOOH oxyhydroxide occurs to a great extent and naturally when charging at high current, overcharging and/or during long term storage while charged. That transformation is more marked when the electrolyte concentration is high. This is because the $\gamma$-NiOOH phase is thermodynamically more stable than the $\beta$-NiOOH phase. However, even though the $\gamma$-NiOOH phase appears attractive in view of its capacity per unit mass, since a portion of the nickel it contains is in an oxidation state of +4 (J. Labat: Thesis, Bordeaux University, 1965), that phase has the major drawback of causing the electrode to swell by a considerable extent, which can lead to its destruction. The intersheet distance in the $\gamma$-NiOOH phase is about twice that of the $\beta$-NiOOH phase.

For this reason, a number of studies have been carried out to prevent it forming. The skilled person is thus aware that the addition of cadmium, zinc and/or magnesium which is syncrystallized in the Ni(OH)$_2$ hydroxide is effective to a certain extent.

The $\alpha$-Ni(OH)$_2$ phase can be obtained by cathodic deposition or any other method. The $\alpha$-Ni(OH)$_2$ phase has the advantage of possessing much higher conductivity than the $\beta$-Ni(OH)$_2$ phase. However, the $\alpha$-Ni(OH)$_2$ hydroxide spontaneously transforms itself into the $\beta$-Ni(OH)$_2$ hydroxide in the aqueous alkaline medium.

Nickel hydroxide is normally characterized by parameters such as its chemical composition (presence or absence of other metals, proportions), Grain size, Grain shape (spherical or irregular), surface area measured using the B.E.T method, or its dehydration point. The only presently known method of checking the capacity of the active material is to carry out an evaluation as a storage cell, however manufacturing storage cells is a lengthy and costly operation. The problem, therefore, is to have access to a parameter which can reliably and reproducibly ascertain that the active material has high capacity. However, a nickel hydroxide with the same values for those parameters as another hydroxide may have a capacity which differs by as much as 40% relative thereto. This level of variability in the performance of active material is unacceptable to storage cell manufacturers.

In general, it is known that for solid polycrystalline materials, the higher the degree of crystallinity, the lower the electrochemical reactivity. Thus for the majority of crystalline compounds, electrochemical activity is directly related to the number of faults present in the solid, such as vacancies, dislocations, the presence of atoms in interstitial positions, etc. . . . . . As a consequence, high electrochemical reactivity of a material is directly correlated to its crystalline state. A. Delahaye-Vidal et al., (Reactivity of solids, 2 (1986) 223) used transmission electron microscopy specifically to show that highly crystalline $\beta$ type nickel hydroxides have a low electrochemical response as opposed to a hydroxide with low crystallinity which has high reactivity.

For this reason, a number of studies have been concentrated on the addition of monovalent, divalent, trivalent and even quadrivalent foreign ions to nickel hydroxide to modify its crystalline structure and thus improve performance. As an example, E. J. Casey (Journal of the Electrochemical Society, 112 (1965) 371) evaluated 26 different foreign ions and J. P. Harivel (thesis, University of Strasbourg, 1969) studied the effect of Co$^{2+}$, Mg$^{2+}$, Mn$^{2+}$, Zn$^{2+}$, Pb$^{2+}$, Ba$^{2+}$, Fe$^{2+}$, Al$^{3+}$, Si$^{4+}$, and Pb$^{4+}$ on capacity per unit mass and electrode potential. The study was completed by a description of the structural variations in the products obtained. These were amorphous, monophase polycrystalline, and even diphase polycrystalline. The effects of other additives such as cesium, chromium, copper, iron, lanthanum, silver or yttrium on oxygen release and the oxidoreduction potential of nickel hydroxide are mentioned by Corrigan et al., (Journal of the Electrochemical Society, 136 (1989) 723).

More recent studies have calculated the crystallite size of nickel hydroxide from the broadening of lines in the X-ray diffraction diagram. The average coherence distance of the crystal, i.e., the average distance over which the symmetry of the crystal lattice is maintained, normally termed the crystallite size, can be calculated from the width of the X-ray diffraction diagram lines. The crystallite size mentioned by different authors (JP-5 041 213, U.S. Pat. No. 5,384,216, and JP-5 290 841) is normally calculated from the most intense line in the spectrum, the [101] line in the case of nickel hydroxides. Sometimes a less intense line such as the [001] line is used (JP-4 349 353). However, the crystallite size calculated from a single line becomes less significant when the nickel hydroxide contains more than 3% of another metal whose spectrum interferes with that of nickel, in particular in the case of cobalt.

SUMMARY OF THE INVENTION

The aim of the present invention is to provide a nickel electrode with a non-sintered support containing an active material whose capacity is higher than that of active materials in common use.

The invention also aims to provide an electrode containing an active material based on nickel hydroxide where capacity can be reliably and reproducibly estimated before assembling a storage cell.

The invention also aims to provide an alkaline electrolyte storage cell using said electrolyte.

The present invention provides a nickel electrode with a non-sintered support for a storage cell containing an alkaline electrolyte, the electrode comprising a porous three-dimensional conductive structure and an electrochemically active material containing particles of a nickel-based hydroxide with a $\beta$ crystallographic structure.

The invention is characterized in that said hydroxide satisfies at least one of four criteria. These criteria all quantify the number of faults present in the crystal which can constitute sites which are favorable to electrochemical use.

A first criterion is that the ratio of the intensity of the [103] line to the [200] line in the X-ray diffraction diagram of the hydroxide is 1.05±0.10. The X-ray diffraction diagram is recorded under the following conditions:

tube voltage: 40 kV
tube current: 30 mA
scan speed: 0.9 degree/min
K$\alpha$ line of copper: 0.154 nm The lines observed in the X-ray diffraction diagram are caused by the crystalline structure of the $\beta$-Ni(OH)$_2$ hydroxide. The diffracted intensities are linked to the symmetry of the network and to the positions of the Ni atoms in the lattice. Each set of [hkl] lattice planes has an associated number which is proportional to the amplitude of the diffracted beam, termed the structure factor $F_{[hkl]}$, where:

$$F_{[hkl]} = \sum_{r=1}^{p} f_r e^{2\pi i(hx_r + ky_r + lz_r)}$$

where r: index of Ni atom;
p: number of Ni atoms in a crystallite;
$f_r$: scattering factor for atom Ni$_r$;
i: complex number defined by $i^2 = -1$;
h,k,l: indices of diffraction plane;
$x_r, y_r, z_r$: coordinates of atom Ni$_r$ with respect to the a, b, c axes respectively of the lattice.

It is understood that under these conditions, the reduction in the intensity of a diffracted line is linked to the fault density in the crystal. In the present case, the intensity of the [103] line is linked to the increase in the number of faults, the intensity of the [200] line being substantially constant. In accordance with the invention, the ratio of their intensity must be in the range 0.95 to 1.15.

A second criterion is that said hydroxide has a coherence length L of 13±3 nm, said coherence length L having the formula:

$$L = \sqrt[3]{(\Phi_{[100]})^2 \times (\Phi_{[001]})}$$

where $\Phi_{[100]}$ is the crystallite size calculated from the mid-height width of the [100] line and $\Phi_{[001]}$ is the crystallite size calculated from the mid-height width of the [001] line of the X-ray diffraction diagram of said hydroxide.

The coherence length criterion of the invention represents the degree of crystallinity and the proportion of faults in the hydroxide. Since electrochemical activity is linked to a high number of reactive sites constituted by faults in the active material, then in the present case activity is linked to low coherence length. According to the invention, the coherence length must be in the range 10 nm to 16 nm.

This second criterion has the advantage of being based on two high intensity lines which means that precision is high. Further, these two lines are the first to appear when recording the X-ray diffraction diagram, so a limited angle of scan can be used, and hence measurements are speeded up.

A third criterion is that for said hydroxide, the ratio of the sum of the surface areas of the peaks at 3687±10 cm$^{-1}$ and 3600±10 cm$^{-1}$ to the surface area of the peak at 3580±10 cm$^{-1}$ of the Raman spectrum of said hydroxide is 0.11±0.03.

A fourth criterion is that for said hydroxide, the ratio of the surface area of the peak at 511±10 cm$^{-1}$ to the surface area of the peak at 460±10 cm$^{-1}$ in the Raman spectrum of said hydroxide is 1.1±0.1.

The Raman spectrum is recorded under the following conditions:

exciting line (argon): 514.32 nm
laser output: 50 mW
acquisition time: 7 min
surface area analysed: 1 µm$^2$ Raman spectroscopy provides an insight into the molecular structure of the material. This method shows the vibrational motion (elongation or rotation) of interatomic bonds in the crystal. A highly crystalline nickel hydroxide of the $\beta$-Ni(OH)$_2$ type obtained using the method described by Merlin et al. (C. R. Acad. Sci., 236 (1953) 1892) shows three peaks which correspond to a symmetrical elongation mode in the O—H bond (about 3580 cm$^{-1}$) and to two vibrational modes of the Ni—OH bond (about 460 cm$^{-1}$ and 315 cm$^{-1}$). Depending on the operating conditions, a displacement of the spectrum of about plus or minus 10 cm$^{-1}$ to one side or the other of the average values may be observed. The method of Merlin et al. consists of holding a mixture of 5 ml of 0.1M NiSO$_4$ and of 25 ml of 2M NH$_4$OH at 90° C. until it is completely decolored, then recovering the precipitate of NiOH which is formed.

The nickel hydroxides of the present invention are disordered $\beta$-Ni(OH)$_2$ type hydroxides whose Raman spectra have been described by Cornilsen et al. (Jnl. Power Sources, 29, ¾ (1990) 453–466). They have two additional peaks in the O—H bond area at about 3687 cm$^{-1}$ and 3600 cm$^{-1}$. These additional peaks appear at higher wave numbers than that of the principal peak at 3580 cm$^{-1}$, meaning that the hydroxyl groups are subjected to fewer constraints from their environment than those represented by the principal peak. In the case of the peak located near 3687 cm$^{-1}$, the hydroxyl groups represented by it can be considered to be located at the crystallite surface. When the reactivity of the nickel hydroxides increases, the size of the crystallites measured by X-ray diffraction reduces and their surface/volume ratio increases. As a result, the number of hydroxyl groups at the surface increases, as well as the surface area of the additional peak located at about 3687 cm$^{-1}$ in the Raman spectrum. Regarding the peak located at about 3600 cm$^{-1}$, the hydroxyl groups which it represents can be considered to be located near faults in the crystalline structure. When the reactivity of the nickel hydroxides increases, the number of hydroxyl groups located near to faults in the crystalline structure increases, as well as the surface area of the additional peak located at about 3600 cm$^{-1}$ in the Raman spectrum. In accordance with the invention, the ratio of the sum of the surface areas of the peaks at about 3687 cm$^{-1}$ and 3600 cm$^{-1}$ to the surface area of the peak at about 3580 cm$^{-1}$ must be in the range 0.08 to 0.14.

Compared with ordered β-Ni(OH)$_2$, the nickel hydroxides of the invention have a further peak at about 511 cm$^{-1}$ which is attributable to the Ni—O bond where the oxygen no longer carries a proton. The presence of a peak at 511 cm$^{-1}$ can thus be correlated with the quantity of proton vacancies in the hydroxide. The quantity of proton vacancies in the material is related to the proton diffusion coefficient in the crystalline solid, i.e., to the reactivity of the nickel hydroxide. According to the invention, the ratio of the surface area of this peak to that of the peak at 460 cm$^{-1}$ in the Raman spectrum for Ni(OH)$_2$ must be in the range 1.0 to 1.2.

Each of the criteria described above can be used alone to determine the hydroxide which will be suitable for manufacturing the electrode of the invention. Preferably, the hydroxide satisfies at least two of the above criteria. However, the hydroxide can also simultaneously satisfy three, or even all four of the above criteria. In the majority of cases, the fact that the hydroxide satisfies one of these criteria automatically means that it also satisfies the other three criteria.

The present invention provides an electrode in which the active material is a nickel-based hydroxide with a β crystallographic structure obtained using any synthesis method, including any method other than that described in the present application. In particular, the grains of powdered hydroxide obtained may take any form from a more or less spherical form to a completely irregular form.

Preferably, the nickel-based hydroxide contains at least one syncrystallized hydroxide of a metal selected from cobalt, cadmium, zinc, calcium and magnesium. It should be understood that the term "hydroxide" used in the present application means both a nickel hydroxide and a hydroxide Containing mainly nickel and also at least one of these metals. Normally, less than 10.5% of cadmium hydroxide is added to the active material to improve chargeability and reduce swelling of the electrode. Swelling can also be reduced by adding not more than 8% of zinc hydroxide. When cobalt and cadmium hydroxides are present, the total quantity of these hydroxides remains below 16.5%; and when a zinc hydroxide is added to them, the total quantity of the three hydroxides does not exceed 12.5%. When cobalt and zinc hydroxides are present, the total quantity of these hydroxides remains below 14%.

Cobalt hydroxide, generally present in a proportion of at most 10% by weight of said hydroxide, improves conductivity and chargeability of the electrode by reducing the oxidoreduction potential of the nickel hydroxide (V. Z. Barzukov et al., Soviet Electrochem., 21 (1985) 14; M. E. Folquer, J. Electroanal. Chem., 172 (1984) 235). In a hydroxide containing nickel hydroxide and syncrystallized cobalt hydroxide, the cobalt atoms are very close in size to the nickel atoms and they occupy sites which would normally be occupied by nickel atoms in a hydroxide composed exclusively of nickel atoms. As a result, the crystallographic structure of the nickel hydroxide is not modified by the addition of cobalt hydroxide. In order for cobalt addition to be completely effective, the cobalt atoms must be uniformly distributed in the nickel hydroxide. During formation of the hydroxide, the cobalt atoms are syncrystallized with an oxidation number of +III thus creating proton vacancies in the crystal. Uniform distribution of the cobalt atoms must improve the proton diffusion coefficient, and as a result the performance of the active material under rapid conditions. Thus, better hot chargeability is obtained and self-discharging of the hydroxide is reduced by displacing the oxidoreduction potential. If the cobalt hydroxide is introduced non-uniformly into the crystalline structure of the nickel hydroxide, the cobalt atoms group themselves into clusters and the resulting proton vacancies will no longer correspond to the quantity of atoms inserted. Known methods are ineffective for observing the distribution of cobalt at low dopant concentrations. In particular, X-ray diffraction will only detect the presence of a second phase due to non uniform distribution of cobalt above a proportion of about 5%.

In a particular embodiment of the present invention, the hydroxide is mainly composed of a nickel hydroxide and contains at least a proportion by weight P, as a % of said hydroxide, of a syncrystallized cobalt hydroxide, said hydroxide further satisfying the following criterion:

a ratio Q of the intensity of the peak at 511±10 cm$^{-1}$ to the intensity of the peak at 460±10 cm$^{-1}$ in the Raman spectrum of said hydroxide which is such that:

Q=xP+y where x=0.24±0.02 and y≧0.7.

The ratio Q of the intensity of the peak at 511±10 cm$^{-1}$ to the intensity of the peak at 460±10 cm$^{-1}$ in the Raman spectrum is a dimensionless number. The proportion P of cobalt is the ratio of the weight of cobalt hydroxide to the total weight of nickel-based hydroxide expressed as a %, and is also dimensionless. Application of these criteria ensures that the distribution of the cobalt in the crystalline structure of the nickel hydroxide is uniform.

The present invention also provides a method of manufacturing a nickel-based hydroxide contained in said electrode which comprises the following steps:

forming an aqueous solution comprising a nickel salt, such as a chloride, a sulfate, or a nitrate, said solution being maintained at a constant temperature in the range 20° C. to 80° C.;

precipitating said hydroxide by continuous addition of an aqueous solution of a strong base to said solution for a period in the range 15 minutes to one hour;

ageing said hydroxide in said solution, by maintaining a constant temperature, for a period in the range one hour to six hours;

separating said hydroxide from said solution by filtration, drying at a temperature in the range 70° C. to 120° C., washing with water, and drying.

The hydroxide obtained is then ground and sieved to recover the fraction of grain size suitable for producing the electrode of the invention.

The solution preferably also contains a salt of at least one metal selected from cobalt, cadmium, zinc, calcium, and magnesium.

Further characteristics and advantages of the present invention will become apparent from the following examples which are, of course, given by way of illustration and are in no way limiting, and which refer to the accompanying drawings in which:

BRIEF DESCRIPTION OF THE DRAWINGS

FIG. 4 shows the high wave number region of the Raman spectrum of the hydroxide contained in electrodes of the invention compared with the hydroxide contained in electrodes which do not conform with the invention, the relative intensities J of the peaks are up the ordinate and the wave number K in $cm^{-1}$ is shown along the abscissa;

FIG. 5 is analogous to FIG. 4 and shows the low wave number region;

FIG. 6 shows the relationship between electrode capacity and the ratio of the intensity of the [103] line to the [200] line in the X-ray diffraction diagram of the hydroxide contained in the electrodes, the value of the ratio M of the relative intensities of the lines are up the ordinate and the capacity R in mAh/g is along the abscissa;

FIG. 7 shows the relationship between electrode capacity and the coherence length of the hydroxide contained in the electrodes, the coherence length of the peaks in nanometers is up the ordinate and the capacity R in mAh/g is along the abscissa;

DESCRIPTION OF THE PREFERRED EMBODIMENTS

Example 1

Figure 1:
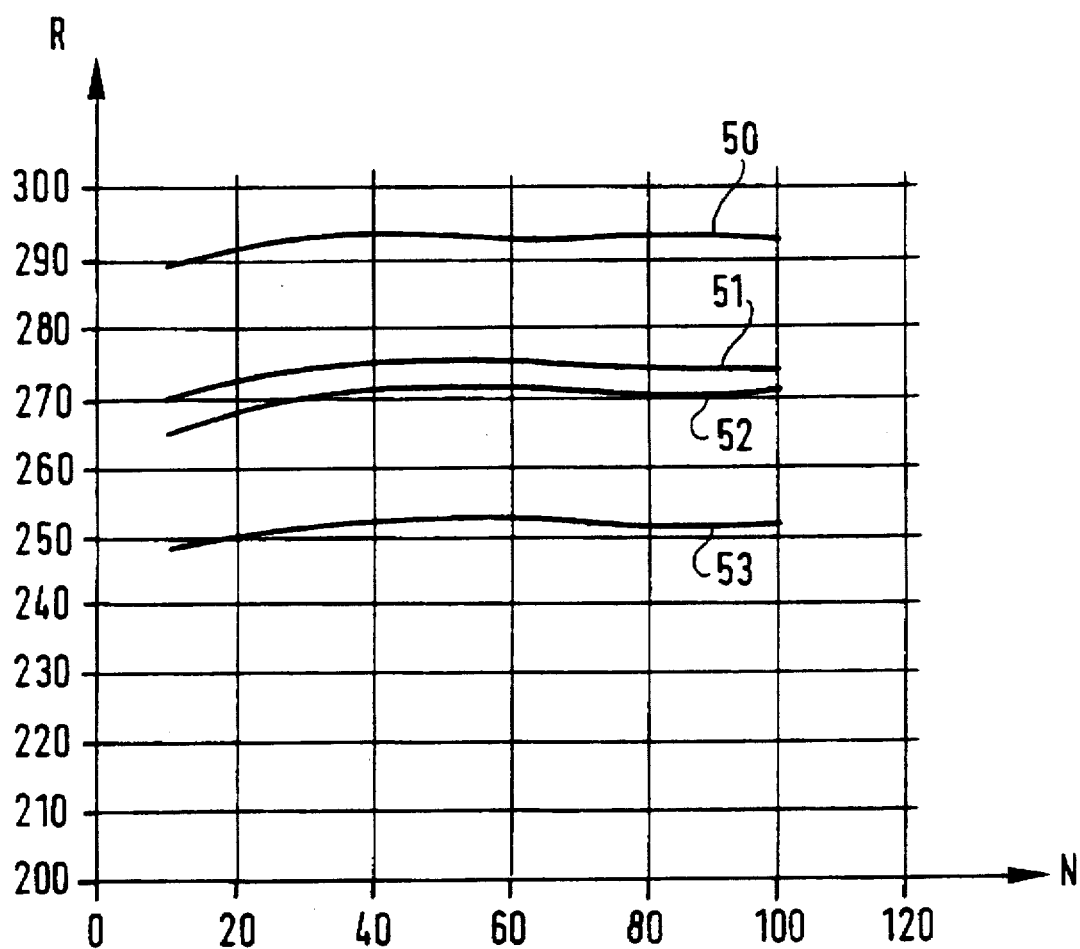
FIG. 1 shows a cycling curve for a nickel-cadmium storage cell containing an electrode in accordance with the present invention, the discharged capacity per unit mass of positive active material R is up the ordinate in mAh/g and the number of cycles N is along the abscissa.

A sample a of nickel-based hydroxide conforming with the present invention was prepared containing 1% by weight of syncrystallized cobalt hydroxide and 7% by weight of syncrystallized cadmium hydroxide.

A precipitation reactor was provided with a double envelope to regulate the temperature uniformly and with stirring means comprising a mobile blade and counter-blades, to control hydrodynamic synthesis conditions.

3.5 liters (l) of an aqueous 1M solution of nickel, cobalt, and cadmium nitrates was introduced in the proportions required to obtain the desired hydroxide into the reactor which was held at a constant temperature of 36° C. 1962 g of a 4M sodium hydroxide solution was introduced over 30 minutes at a constant and continuous rate. When the addition of sodium hydroxide was complete, stirring and heating of the solution were maintained for 3 hours to age the hydroxide particles. The precipitate was then filtered through a Büchner funnel, dried for 48 hours in an oven at a temperature of 90° C., then washed with deionized water. The precipitate was ground and screened to the fraction with a suitable grain size.

Sample a was then characterized. From the X-ray diffraction diagram of sample a, the relative intensities of the [103] line and the [200] line were measured and the ratio was calculated. To increase the accuracy of the measurements, the [103] and [200] lines were deconvoluted by using "Pseudo-Voigt" reference curves and by aligning the experimental curves.

The intensity ratio of the [103] line to the [200] line for sample a was 0.95. The coherence length was 10.5 nm. The crystallite size calculated from the mid-height width of the most intense [101] line was 2.5 nm.

In the case of sample a conforming to the present invention, all four criteria were satisfied simultaneously.

From the Raman spectrum of sample a, the surface areas of the peaks at wave numbers 3687 $cm^{-1}$, 3600 $cm^{-1}$, 3580 $cm^{-1}$, 511 $cm^{-1}$ and 460 $cm^{-1}$ were measured. The ratio of the sum of the surface areas of the peaks at 3687 $cm^{-1}$ and 3600 $cm^{-1}$ to the surface area of the peak at 3580 $cm^{-1}$ was calculated to be 0.137. The ratio of the surface area of the peak at 511 $cm^{-1}$ to the surface area of the peak at 460 $cm^{-1}$ was calculated to be 1.17.

An electrode of the invention was fabricated by mixing 41% by weight of active material composed of sample a, 5% of a cobalt hydroxide, and 54% of a gel composed of a cellulose binder in an aqueous solvent. The paste obtained was introduced into a nickel sponge of about 95% porosity. The assembly was dried then rolled to produce the electrode.

A nickel-cadmium type storage cell was assembled which contained the electrode as formed above, surrounded by two sintered cadmium electrodes of known type. The electrodes were separated by two non-woven polyamide layers and an oxygen-impermeable cellulose membrane layer. The assembly was impregnated with an alkaline electrolyte, an aqueous solution of 9.1N potassium hydroxide KOH, and 0.2M lithium hydroxide.

After leaving for 48 hours, the storage cell, with a nominal capacity of $C_n$, was cycled under the following conditions:

cycle 1: charge at 0.1 $C_n$ for 10 hours; discharge at 0.2 $C_n$ to an end-point voltage of 1 V;

subsequent cycles: charge at 0.2 $C_n$ for 7.5 hours (h); discharge at 0.2 $C_n$ to 1 volt.

After stabilizing, the discharged capacity was measured as 292 mAh/g of positive active material for sample a, corresponding to an exchange of 1.25 electrons per mole of $Ni(OH)_2$. It should be remembered at this juncture that the positive active material was constituted by nickel hydroxide, which may contain syncrystallized hydroxides, and a conductive material which may have been added. Curve 50 in FIG. 1 shows that the discharged capacity did not vary during cycling over 100 cycles.

The results are shown in Table I below.

Example 2

A sample b of a nickel-based hydroxide in accordance with the present invention was prepared which contained 1% of cobalt hydroxide and 7% of syncrystallized cadmium hydroxide, using a precipitation method which was analogous to that described in Example 1, except that a precipitation temperature of 50° C. was used. Sample b obtained was then characterized.

Figure 2:
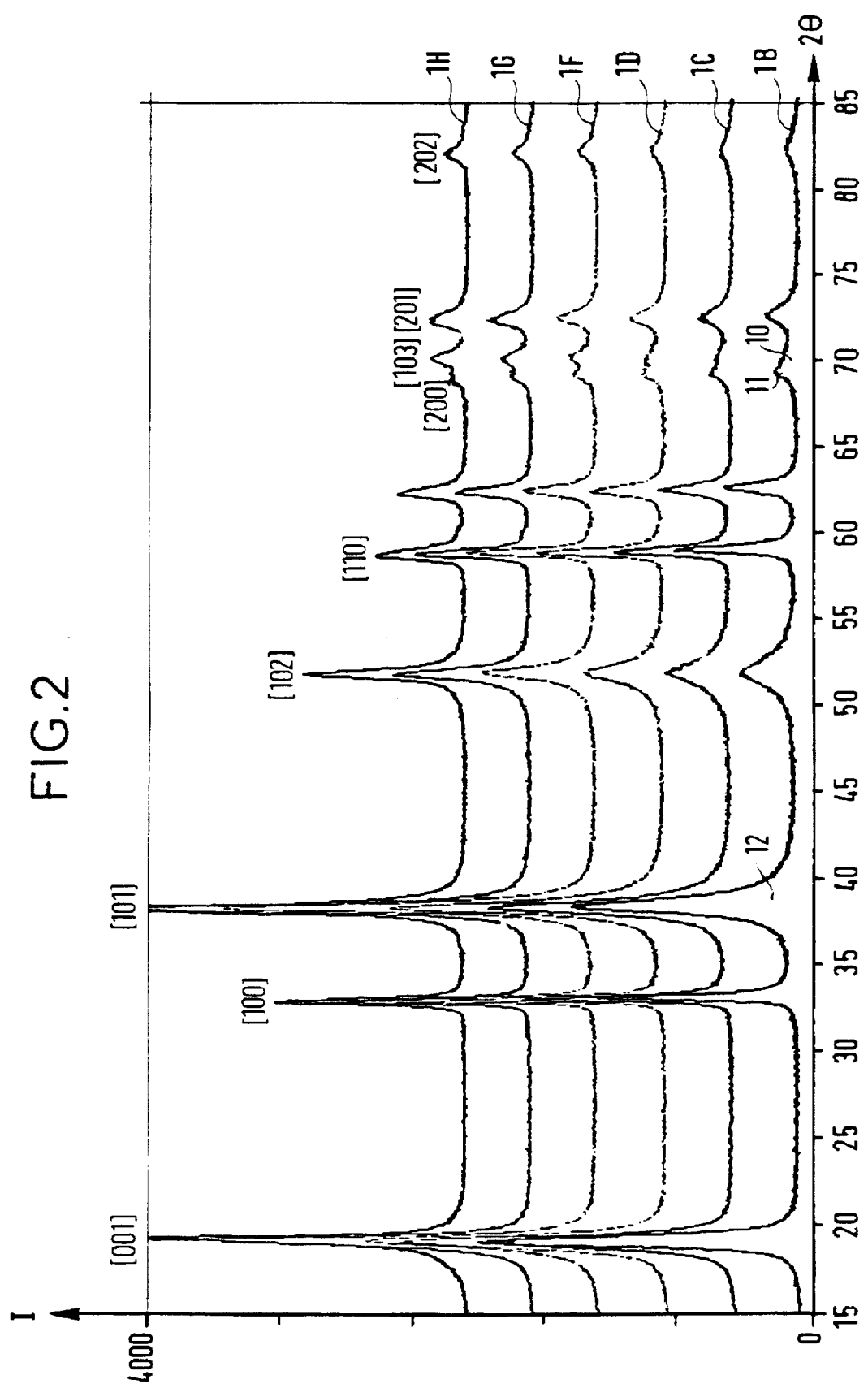
FIG. 2 shows the X-ray diffraction diagram of the hydroxide contained in the electrodes of the invention compared with the hydroxide contained in electrodes which do not conform with the invention, the relative intensities I of the lines are shown up the ordinate and the angle 2θ in degrees is shown along the abscissa.
Figure 3:
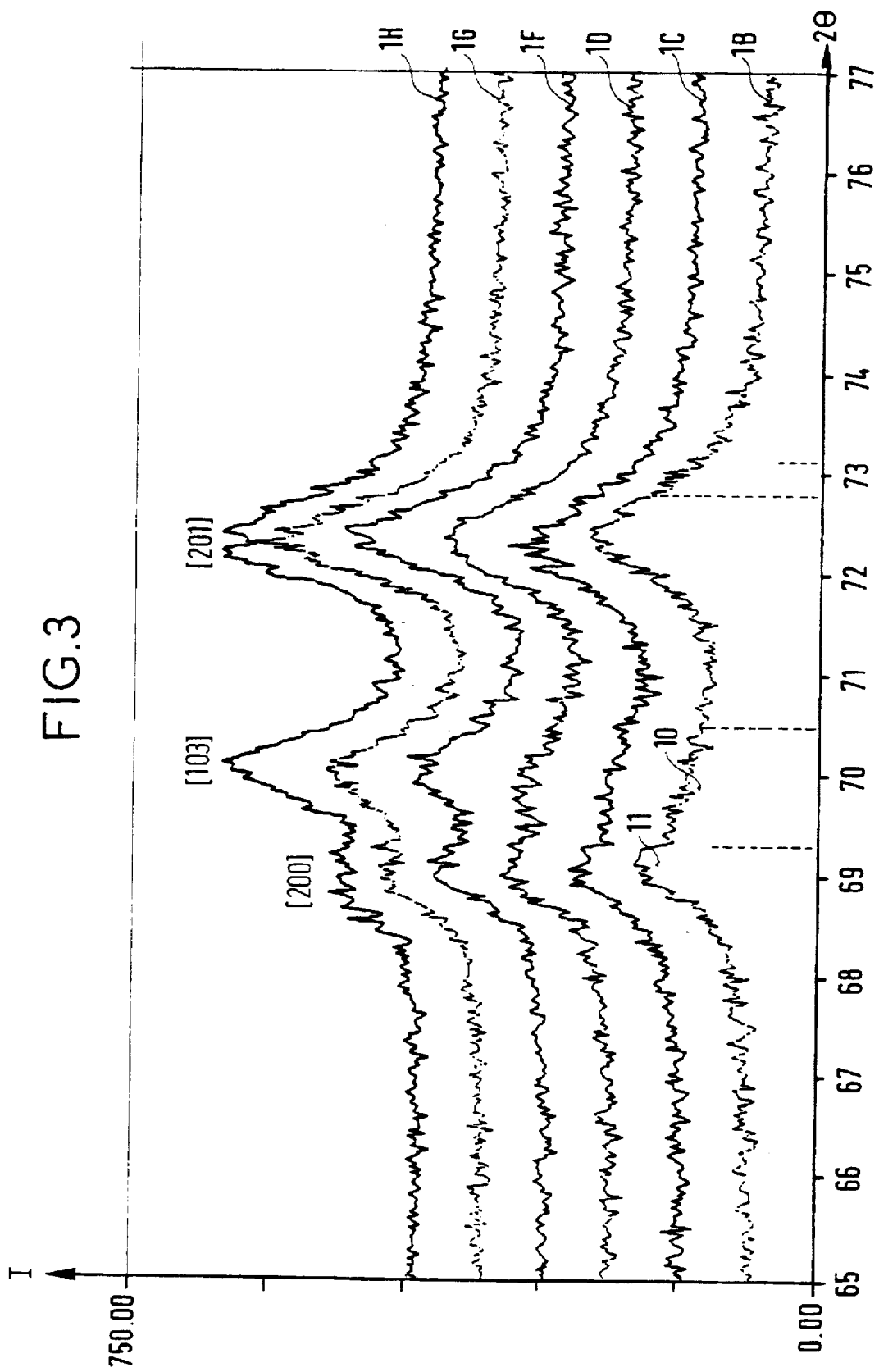
FIG. 3 is analogous to FIG. 2 and shows an enlarged portion of the area of lines [103] and [200]

The X-ray diffraction diagram of sample b is shown in curve 1B in FIG. 2 and enlarged in FIG. 3; it was recorded under the same conditions as those given for Example 1. From this diagram, the relative intensities of line 10 [103] and line 11 [200] were measured and the ratio was calculated.

The intensity ratio of line 10 [103] to line 11 [200] for sample b was 0.95. The coherence length was 14.1 nm. The crystallite size calculated from the mid-height width of line 12 [101] was 6.3 nm.

Curve 2B in FIG. 4 shows the Raman spectrum for sample b for high wave numbers and FIG. 5 shows the spectrum for low wave numbers; it was recorded under the same conditions as those given for Example 1. From this spectrum, the surface areas of peaks 20, 21, 22, 23 and 24 at wave numbers 3687 $cm^{-1}$, 3600 $cm^{-1}$, 3580 $cm^{-1}$, 511 $cm^{-1}$ and 460 $cm^{-1}$ were measured. The ratio of the sum of the surface areas of peaks 20 and 21 at 3687 $cm^{-1}$ and 3600 $cm^{-1}$ to the surface area of peak 22 at 3580 $cm^{-1}$ was calculated to be 0.116 for sample b. The ratio of the surface area of peak 23 at 511 $cm^{-1}$ to the surface area of peak 24 at 460 $cm^{-1}$ was calculated to be 1.13.

For sample b which was in accordance with the present invention, all four criteria were satisfied simultaneously.

A Ni—Cd storage cell analogous to that of Example 1 but comprising an electrode containing sample b was cycled under the same conditions as those given in Example 1. After stabilizing, the discharged capacity was measured as 273 mAh/g of positive active material for sample b, corresponding to an exchange of 1.16 electrons per mole of $Ni(OH)_2$. Curve 51 in FIG. 1 shows that the discharged capacity did not vary during cycling over 100 cycles.

The results are shown in Table I below.

Example 3

A sample c of a nickel-based hydroxide in accordance with the present invention was prepared which contained 1% of cobalt hydroxide and 7% of syncrystallized cadmium hydroxide, using a precipitation method which was analogous to that described in Example 2, except that drying was effected at a temperature of 105° C. Sample c obtained was then characterized The X-ray diffraction diagram of sample c is shown in curve 1C in FIG. 2 and enlarged in FIG. 3; it was recorded under the same conditions as those given for Example 1. From these diagrams, the relative intensities of the [103] line and the [200] line were measured and the ratio was calculated.

The intensity ratio of the [103] line to the [200] line for sample c was 1.00. The coherence length was 14.7 nm. The crystallite size calculated from the mid-height width of the most intense [101] line was 6.8 nm.

The Raman spectrum for sample c for high wave numbers and the spectrum for low wave numbers were recorded under the same conditions as those given for Example 1. From this spectrum, the surface areas of the peaks at wave numbers 3687 $cm^{-1}$, 3600 $cm^{-1}$, 3580 $cm^{-1}$, 511 $cm^{-1}$ and 460 $cm^{-1}$ were measured. The ratio of the sum of the surface areas of the peaks at 3687 $cm^{-1}$ and 3600 $cm^{-1}$ to the surface area of the peak at 3580 $cm^{-1}$ was calculated to be 0.110 for sample c. The ratio of the surface area of the peak at 511 $cm^{-1}$ to the surface area of the peak at 460 $cm^{-1}$ was calculated to be 1.09.

For sample c which was in accordance with the present invention, all four criteria were satisfied simultaneously.

A Ni—Cd storage cell analogous to that of Example 1 but comprising an electrode containing sample c was cycled under the same conditions as those given in Example 1. After stabilizing, the discharged capacity was measured as 270 mAh/g of positive active material for sample c, corresponding to an exchange of 1.15 electrons per mole of $Ni(OH)_2$. Curve 52 in FIG. 1 shows that the discharged capacity did not vary during cycling over 100 cycles.

The results are shown in Table I below.

Example 4

A sample d of a nickel-based hydroxide in accordance with the present invention was prepared which contained 1% of cobalt hydroxide and 7% of syncrystallized cadmium hydroxide, using a precipitation method which was analogous to that described in Example 2, except that a drying temperature of 115° C. was used. Sample d obtained was then characterized.

The X-ray diffraction diagram of sample d is shown in curve 1D in FIG. 2 and enlarged in FIG. 3; it was recorded under the same conditions as those given for Example 1. From this diagram, the relative intensities of the [103] line and the [200] line were measured and the ratio was calculated.

The intensity ratio of the [103] line to the [200]line for sample d was 1.14. The coherence length was 15.9 nm. The crystallite size calculated from the mid-height width of the most intense [101] line was 7.7 nm.

Curve 2D in FIG. 4 shows the Raman spectrum for sample d for high wave numbers and FIG. 5 shows the spectrum for low wave numbers; it was recorded under the same conditions as those given for Example 1. From this spectrum, the surface areas of the peaks at wave numbers 3687 $cm^{-1}$, 3600 $cm^{-1}$, 3580 $cm^{-1}$, 511 $cm^{-1}$ and 460 $cm^{-1}$ were measured. The ratio of the sum of the surface areas of the peaks at 3687 $cm^{-1}$ and 3600 $cm^{-1}$ to the surface area of the peak at 3580 $cm^{-1}$ was calculated to be 0.084 for sample d. The ratio of the surface area of the peak at 511 $cm^{-1}$ to the surface area of the peak at 460 $cm^{-1}$ was calculated to be 1.02.

For sample d which was in accordance with the present invention, all four criteria were satisfied simultaneously.

A Ni—Cd storage cell analogous to that of Example 1 but comprising an electrode containing sample d was cycled under the same conditions as those given in Example 1. After stabilizing, the discharged capacity was measured as 251 mAh/g of positive active material for sample d, corresponding to an exchange of 1.07 electrons per mole of $Ni(OH)_2$. Curve 53 in FIG. 1 shows that the discharged capacity did not vary during cycling over 100 cycles.

The results are shown in Table I below.

Examples 5 to 8

Samples e, f, g and h of nickel-based hydroxide not in accordance with the present invention were prepared contining 1% of cobalt hydroxide and 7% of cadmium hydroxide, using a precipitation method which was analogous to that described in Example 2 but using a precipitation temperature of more than 80° C. and/or a drying temperature of more than 120° C. Samples e to h obtained were then characterized.

The X-ray diffraction diagram of samples f, g and h are shown in curves 1F, 1G and 1H in FIG. 2 and enlarged in FIG. 3; they were recorded under the same conditions as those given for Example 1. From these diagrams of samples e to h, the relative intensities of the [103] line and the [200] line were measured and the ratio was calculated. The coherence length was also calculated from the mid-height width of the [100] and [001] lines, also the crystallite size from the mid-height width of the most intense [101] line.

The intensity ratio of the [103] line to the [200] line for samples e, f, g and h were respectively 1.28, 1.33, 1.71 and 2.69. Thus the first criterion of the invention was not satisfied.

The coherence length of samples e, f, g and h were respectively 16.4 nm, 16.7 nm, 18.5 nm and 20.8 nm. Thus the second criterion of the invention had not been satisfied.

The crystallite sizes of samples e, f, g and h, calculated from the mid-height width of the most intense [101] line, were respectively 9.5 nm, 10.4 nm, 12.8 nm and 13.7 nm.

Curves 2F, 2G and 2H in FIG. 4 shows the Raman spectra for samples f, g and h for high wave numbers and FIG. 5 shows the spectra for low wave numbers; they were recorded under the same conditions as those given for Example 1. From these spectra, the surface areas of the peaks at wave numbers 3687 cm$^{-1}$, 3600 cm$^{-1}$, 3580 cm$^{-1}$, 511 cm$^{-1}$ and 460 cm$^{-1}$ were measured. The ratio of the sum of the surface areas of the peaks at 3687 cm$^{-1}$ and 3600 cm$^{-1}$ to the surface area of the peak at 3580 cm$^{-1}$ was calculated for samples f to h, also the ratio of the surface area of the peak at 511 cm$^{-1}$ to the surface area of the peak at 460 cm$^{-1}$.

The ratio of the sum of the surface areas of the peaks at 3687 cm$^{-1}$ and 3600 cm$^{-1}$ to the surface area of the peak at 3580 cm$^{-1}$ was calculated as 0.062, 0.038 and 0.0076 respectively for samples f, g and h. Thus the third criterion of the invention had not been satisfied.

Calculation of the ratio of the surface area of the peak at 511 cm$^{-1}$ to the surface area of the peak at 460 cm$^{-1}$ for samples f, g and h produced values of 0.96, 0.93 and 0.63 respectively. Thus the fourth criterion of the invention had not been satisfied.

Ni—Cd storage cells analogous to that of Example 1 but comprising electrodes containing samples e, f, g and h were cycled under the same conditions as those given in Example 1. After stabilizing, the discharged capacity was measured for samples e to h.

The results for all of these samples are shown in Table I below.

TABLE I

| REFERENCE | a | b | c | d | e | f | g | h |
| --- | --- | --- | --- | --- | --- | --- | --- | --- |
| $M = I_{[103]}/I_{[200]}$ | 0.95 | 0.98 | 1.00 | 1.14 | 1.28 | 1.33 | 1.71 | 2.69 |
| $L = \sqrt[3]{(\Phi_{[100]})^2 \times (\Phi_{[001]})}$ (nm) | 10.5 | 14.1 | 14.7 | 15.9 | 16.4 | 16.7 | 18.5 | 20.8 |
| Crystallite size (nm) from [101] line | 2.5 | 6.3 | 6.8 | 7.7 | 9.5 | 10.4 | 12.8 | 13.7 |
| $S_1 = S_{3600} + S_{3687}/S_{3580}$ | 0.137 | 0.116 | 0.11 | 0.084 | — | 0.062 | 0.038 | 0.0076 |
| $S_2 = S_{511}/S_{460}$ | 1.17 | 1.13 | 1.09 | 1.02 | — | 0.96 | 0.93 | 0.63 |
| Number of electrons exchanged per mole of Ni(OH)$_2$ | 1.25 | 1.16 | 1.15 | 1.07 | 0.98 | 0.94 | 0.89 | 0.77 |
| Capacity (mAh/g) of positive active material | 292 | 273 | 270 | 251 | 230 | 221 | 207 | 180 |

The theoretical yield of nickel hydroxide was 289 mAh/g, based on exchanging one electron per mole of Ni(OH)$_2$ in accordance with the following electrochemical reaction:

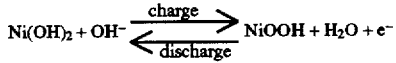

In practice, the observed capacities for the nickel hydroxide can be higher than this value. Storage cell manufacturers have a major interest in active materials for which the discharged capacity per unit mass of nickel hydroxide is greater than or equal to this theoretical value, corresponding to the exchange of more than one electron per mole of nickel hydroxide.

FIG. 6 shows the relationship between the intensity ratio M of the [103] line to the [200] line in the X-ray diffraction diagram and the capacity per unit mass R of the active material corresponding to the above samples a to h. When the value for this ratio is in the range 0.95 to 1.15 for the hydroxide, the active materials are observed to satisfy the above condition.

The coherence length L is shown in FIG. 7 in relation to the capacity per unit mass of the active material for the above samples a to h. When the value for this length is in the range 10 nm to 16 nm for the hydroxide, the desired performance for the active material is obtained.

Figure 8:
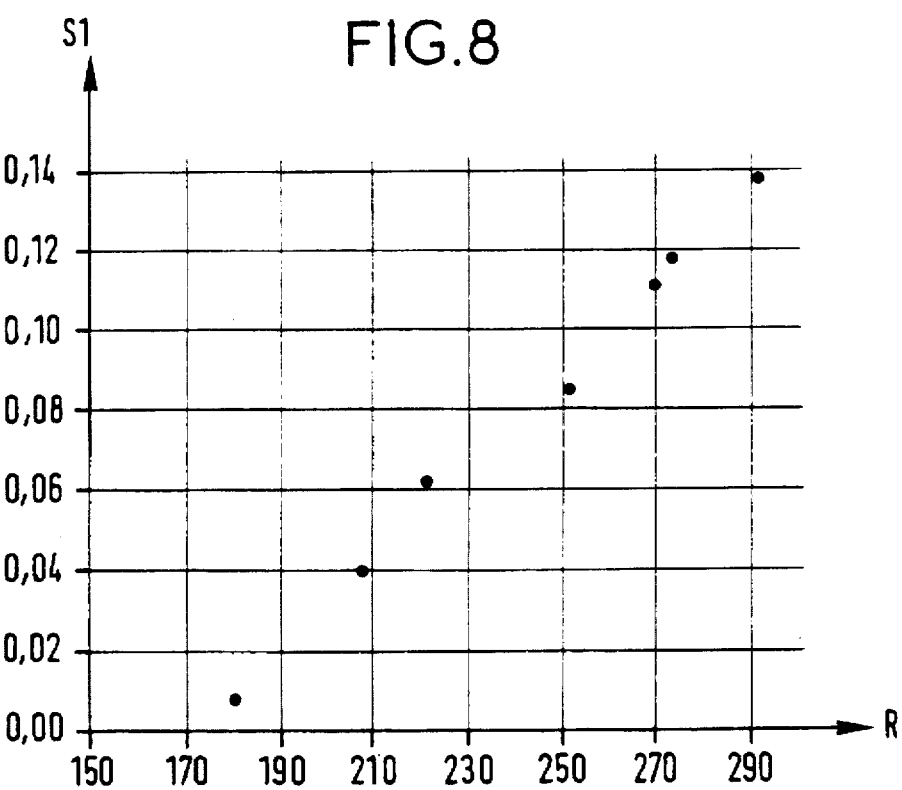
FIG. 8 shows the relationship between electrode capacity and the ratio of the sum of the surface areas of the peaks at 3687 $cm^{-1}$ and 3600 $cm^{-1}$ to the surface area of the peak at 3580 $cm^{-1}$ in the Raman spectrum of the hydroxide contained in the electrodes, the value of the ratio S1 of the surface area of the peaks is up the ordinate and the capacity R in mAh/g is along the abscissa.

FIG. 8 shows the relationship between the ratio of the sum S1 of the surface areas of the peaks at 3590 cm$^{-1}$ and 3680 cm$^{-1}$ to the surface area of the peak at 3580 cm$^{-1}$ in the Raman spectrum and the capacity per unit mass of the active material corresponding to the above samples a to h. When the value for this ratio is in the range 0.08 to 0.14 for the hydroxide, satisfactory performance was obtained for the active material.

Figure 9:
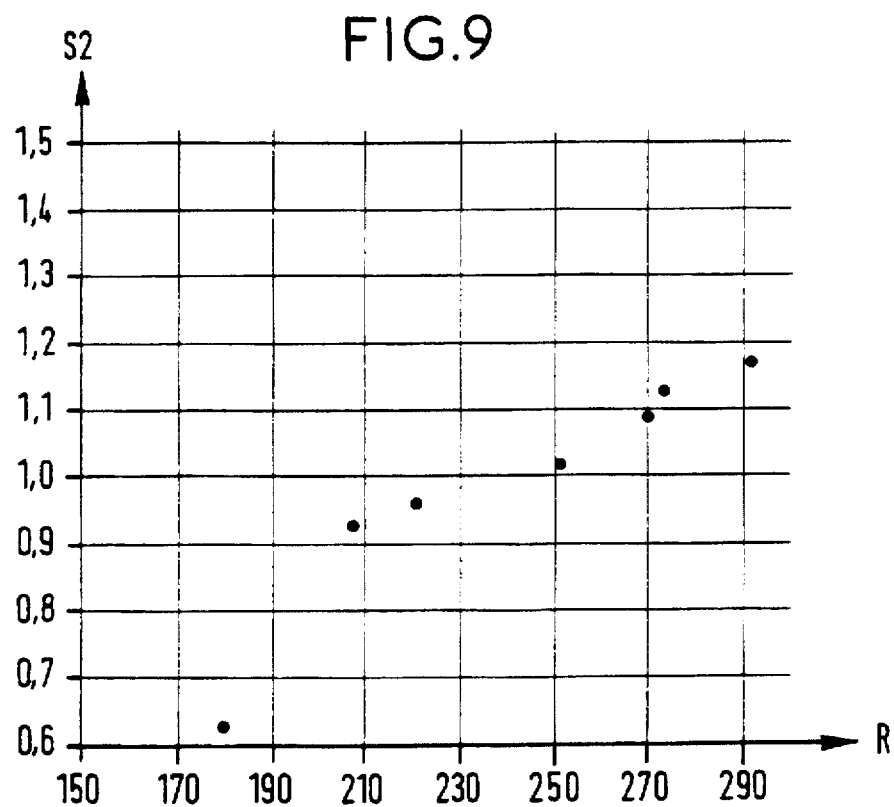
FIG. 9 shows the relationship between electrode capacity and the ratio of the surface area of the peak at 511 $cm^{-1}$ to the surface area of the peak at 460 $cm^{-1}$ in the Raman spectrum of the hydroxide contained in the electrodes, the value of the ratio S2 of the surface area of the peaks is up the ordinate and the capacity R in mAh/g is along the ordinate.

Similarly, FIG. 9 shows the relationship between the ratio S2 of the surface areas of the peaks at 511 cm$^{-1}$ to the surface area of the peak at 460 cm$^{-1}$ in the Raman spectrum and the capacity per unit mass of the active material corresponding to the above samples a to h. Satisfactory performance was obtained for the active material when the values for this ratio were in the range 1.0 to 1.2.

Example 9

A sample i of a nickel-based hydroxide in accordance with the present invention was prepared which contained 1% of cobalt hydroxide and 4% of syncrystallized zinc hydroxide, using a precipitation method which was analogous to that described in Example 1. Sample i obtained was then characterized.

The X-ray diffraction diagram of sample i was recorded under the same conditions as those given for Example 1. From this diagram, the relative intensities of the [103] line and the [200] line were measured and the ratio was calculated.

The intensity ratio of the [103] line to the [200] line for sample i was 1.24. The coherence length was 25.0 nm. The crystallite size calculated from the mid-height width of the most intense [101] line was 13.0 nm. Thus the first and second criteria of the invention were not satisfied.

The Raman spectrum of sample i was recorded under the same conditions as those given for Example 1 and used to measure the surface areas of the peaks at wave numbers 3687 $cm^{-1}$, 3600 $cm^{-1}$, 3580 $cm^{-1}$, 511 $cm^{-1}$ and 460 $cm^{-1}$. The ratio of the sum of the surface areas of the peaks at 3687 $cm^{-1}$ and 3600 $cm^{-1}$ to the surface area of the peak at 3580 $cm^{-1}$ was calculated to be 0.130 for sample i. The ratio of the surface area of the peak at 511 $cm^{-1}$ to the surface area of the peak at 460 $cm^{-1}$ was calculated to be 1.20. Thus the third and fourth criteria of the invention were satisfied.

A Ni—Cd storage cell analogous to that of Example 1 but comprising an electrode containing sample i was cycled under the same conditions as those given in Example 1. After stabilizing, the discharged capacity was measured as 289 mAh/g of active material for sample i, corresponding to an exchange of 1.23 electrons per mole of $Ni(OH)_2$.

The results are shown in Table II below.

Example 10

A sample j of a nickel-based hydroxide in accordance with the present invention was prepared which contained 1% of cobalt hydroxide and 4% of syncrystallized zinc hydroxide, using a precipitation method which was analogous to that described in Example 2. Sample j obtained was then characterized.

The X-ray diffraction diagram of sample j was recorded under the same conditions as those given for Example 1. From this diagram, the relative intensities of the [103] line and the [200] line were measured and the ratio was calculated.

The intensity ratio of the [103] line to the [200] line for sample j was 1.63. The coherence length was 27.5 nm. The crystallite size calculated from the mid-height width of the most intense [101] line was 16.0 nm. Thus the first and second criteria of the invention were not satisfied.

The Raman spectrum of sample j was recorded under the same conditions as those given for Example 1 and used to measure the surface areas of the peaks at wave numbers 3687 $cm^{-1}$, 3600 $cm^{-1}$, 3580 $cm^{-1}$, 511 $cm^{-1}$ and 460 $cm^{-1}$. The ratio of the sum of the surface areas of the peaks at 3687 $cm^{-1}$ and 3600 $cm^{-1}$ to the surface area of the peak at 3580 $cm^{-1}$ was calculated to be 0.130 for sample j. The ratio of the surface area of the peak at 511 $cm^{-1}$ to the surface area of the peak at 460 $cm^{-1}$ was calculated to be 1.09. Thus the third and fourth criteria of the invention were satisfied.

A Ni—Cd storage cell analogous to that of Example 1 but comprising an electrode containing sample j was cycled under the same conditions as those given in Example 1. After stabilizing, the discharged capacity was measured as 263 mAh/g of active material for sample j, corresponding to an exchange of 1.12 electrons per mole of $Ni(OH)_2$.

The results are shown in Table II below.

Example 11

A sample k of a nickel-based hydroxide not in accordance with the present invention was prepared which contained 4% of cobalt hydroxide and 6% of syncrystallized cadmium hydroxide, using a precipitation method which was analogous to that described in Example 1 but used a drying temperature of more than 120° C. Sample k obtained was then characterized.

The X-ray diffraction diagram of sample k was recorded under the same conditions as those given for Example 1. From this diagram, the relative intensities of the [103] line and the [200] line were measured and the ratio was calculated.

The intensity ratio of the [103] line to the [200] line for sample k was 1.22. Thus the first criterion of the invention was not satisfied.

The coherence length for sample k was 17.0 nm. Thus the second criterion of the invention was not satisfied.

The crystallite size for sample k, calculated from the mid-height width of the most intense [101] line, was 6.9 nm.

The Raman spectrum of sample k was recorded under the same conditions as those given for Example 1 and used to measure the surface areas of the peaks at wave numbers 3687 $cm^{-1}$, 3600 $cm^{-1}$, 3580 $cm^{-1}$, 511 $cm^{-1}$ and 460 $cm^{-1}$. The ratio of the sum of the surface areas of the peaks at 3687 $cm^{-1}$ and 3600 $cm^{-1}$ to the surface area of the peak at 3580 $cm^{-1}$ was calculated to be 0.07 for sample k. The ratio of the surface area of the peak at 511 $cm^{-1}$ to the surface area of the peak at 460 $cm^{-1}$ was calculated to be 1.90. Thus the third and fourth criteria of the invention were not satisfied.

A Ni—Cd storage cell analogous to that of Example 1 but comprising an electrode containing sample k was cycled under the same conditions as those given in Example 1. After stabilizing, the discharged capacity was measured as 223 mAh/g of active material for sample k, corresponding to an exchange of 0.95 electrons per mole of $Ni(OH)_2$.

The results are shown in Table II below.

TABLE II

| REFERENCE | i | j | k |
|---|---|---|---|
| $M = I_{[103]}/I_{[200]}$ | 1.24 | 1.63 | 1.22 |
| $L = \sqrt[3]{(\Phi_{[100]})^2 \times (\Phi_{[001]})}$ (nm) | 25.0 | 27.5 | 17.0 |
| Crystallite size (nm) from [101] line | 13.0 | 16.0 | 6.9 |
| $S_1 = S_{3600} + S_{3687}/S_{3580}$ | 0.13 | 0.13 | 0.07 |
| $S_2 = S_{511}/S_{460}$ | 1.20 | 1.09 | 1.90 |
| Number of electrons exchanged per mole of $Ni(OH)_2$ | 1.23 | 1.12 | 0.95 |
| Capacity (mAh/g) of positive active material | 289 | 263 | 223 |

Example 12

A sample l of a nickel-based hydroxide in accordance with the present invention was prepared which contained 1% of cobalt hydroxide and 4% of syncrystallized zinc hydroxide, using a precipitation method which was analogous to that described in Example 2.

The X-ray diffraction diagram of sample 1 was recorded under the same conditions as those given for Example 1. From this diagram, the relative intensities of the [103] line and the [200] line were measured and the ratio was calculated.

The intensity ratio of the [103] line to the [200]line for sample 1 was 0.96. The coherence length was 15.0 nm. The crystallite size calculated from the mid-height width of the most intense [101] line was 6.2 nm. Thus the first and second criteria of the invention were satisfied.

The Raman spectrum of sample 1 was recorded under the same conditions as those given for Example 1 and used to measure the surface areas of the peaks at wave numbers 3687 $cm^{-1}$, 3600 $cm^{-1}$, 3580 $cm^{-1}$, 511 $cm^{-1}$ and 460 $cm^{-1}$. The ratio of the sum of the surface areas of the peaks at 3687 $cm^{-1}$ and 3600 $cm^{-1}$ to the surface area of the peak at 3580 $cm^{-1}$ was calculated to be 0.120 for sample 1. The ratio of the surface area of the peak at 511 $cm^{-1}$ to the surface area of the peak at 460 $cm^{-1}$ gave a value of 1.10. Thus the third and fourth criteria of the invention were thus satisfied.

Figure 10:
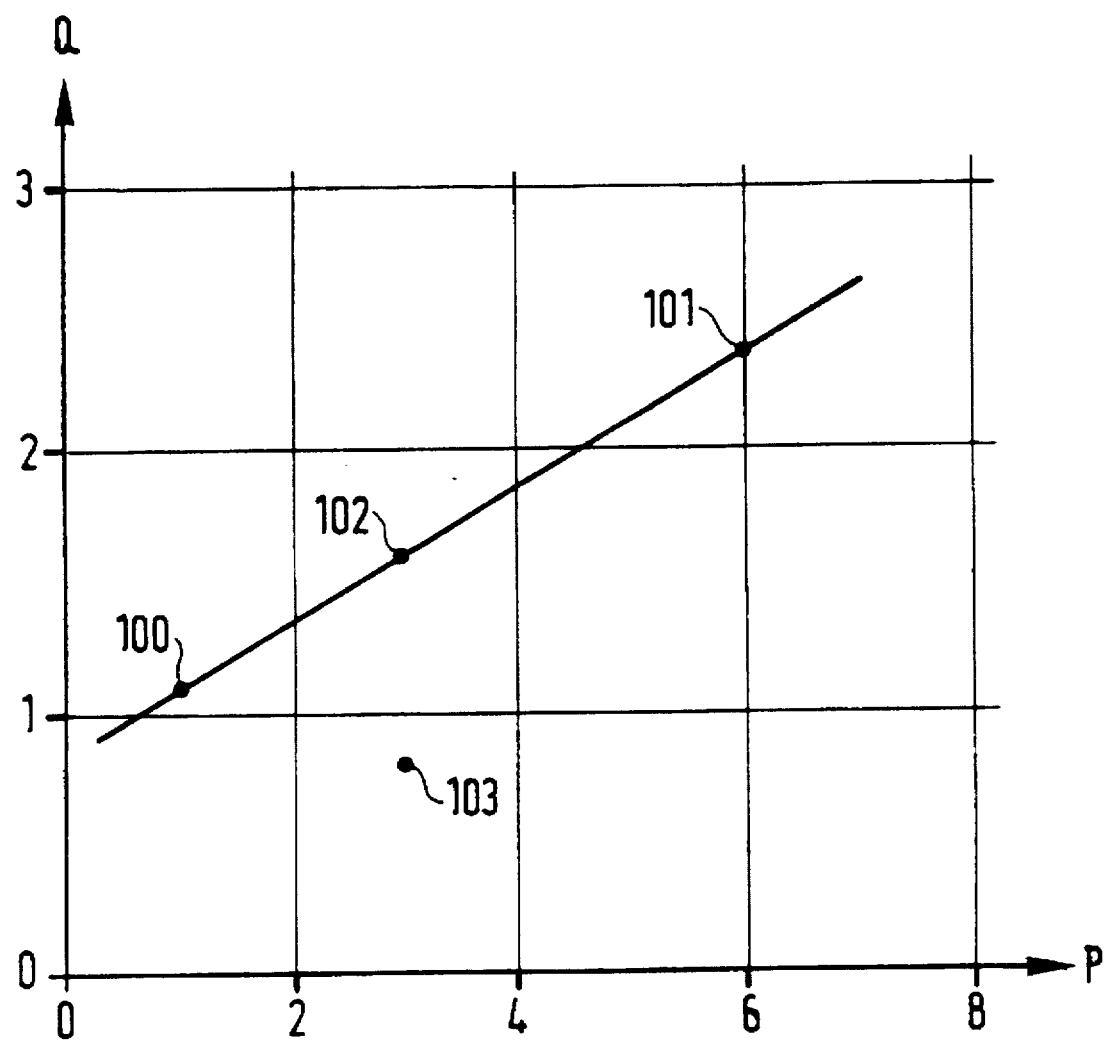
FIG. 10 shows the relationship between the proportion by weight of syncrystallized cobalt hydroxide and the ratio of the intensity of the peak at 511 $cm^{-1}$ to the intensity of the peak at 460 $cm^{-1}$ of the Raman spectrum of the hydroxide contained in the electrodes, the value of the ratio Q of the intensity of the peaks is up the ordinate and the proportion by weight in % is along the abscissa.

The intensity of the peaks located at wave numbers 511 $cm^{-1}$ and 460 $cm^{-1}$ was then measured. Calculation of the ratio of the intensity of the peak at 511 $cm^{-1}$ to the intensity of the peak at 460 $cm^{-1}$ gave a value of 1.1, since 1.1= (0.24×1)+0.86. This result is shown as point 100 in FIG. 10. This criterion ascertains that the cobalt is uniformly distributed in the nickel hydroxide since y≧0.7 for sample 1.

A Ni—Cd storage cell analogous to that of Example 1 but comprising an electrode containing sample 1 was cycled under the same conditions as those given in Example 1. After stabilizing, the discharged capacity was measured as 275 mAh/g of active material for sample 1, corresponding to an exchange of 1.14 electrons per mole of $Ni(OH)_2$.

The discharged capacity was then measured under the following conditions:

charge at 0.05 $C_n$ for 4 hours, then at 0.2 $C_n$ for 5 hours; discharge at 0.33 $C_n$ to an end-point voltage of 1 V.

A first measurement was recorded at ambient temperature. A discharged capacity of 264 mAh/g at ambient temperature was obtained. After five cycles under these conditions at a temperature of 40° C., the same capacity measurement was made but at 40° C. and a capacity of 224 mAh/g was obtained at this temperature. The ratio of the efficiency at 40° C. to that at ambient temperature was 85% for sample 1. This result showed good hot chargeability for sample 1 of the invention containing cobalt hydroxide syncrystallized with nickel hydroxide and uniformly distributed in its crystalline structure.

Self-discharge of the Ni—Cd storage cell described above containing sample 1 was determined under the following conditions:

charge at ambient temperature at 0.2 $C_n$ for 5 hours, then at 0.05 $C_n$ for 4 hours;

rest for 7 days at a temperature of 40° C.;

discharge at 0.33 $C_n$ to an end-point voltage of 1 V.

The discharged capacity which was then measured was compared with that measured under analogous conditions without a rest period. The self-discharge calculation gave a value of 23%, showing good conservation of capacity by sample 1 of the invention which contained cobalt hydroxide syncrystallized with nickel hydroxide and uniformly distributed in its crystalline structure.

The results are shown in Table III below.

Example 13

A sample m of a nickel-based hydroxide in accordance with the present invention was prepared which contained 6% of cobalt hydroxide and 4% of syncrystallized zinc hydroxide, using a precipitation method which was analogous to that described in Example 2.

The X-ray diffraction diagram of sample m was recorded under the same conditions as those given for Example 1. From this diagram, the relative intensities of the [103] line and the [200] line were measured and the ratio was calculated.

The intensity ratio of the [103] line to the [200] line for sample m was 0.96. The coherence length was 14.6 nm. The crystallite size calculated from the mid-height width of the most intense [101] line was 6.3 nm. Thus the first and second criteria of the invention were satisfied.

The Raman spectrum of sample m was recorded under the same conditions as those given for Example 1 and used to measure the surface areas of the peaks at wave numbers 3687 $cm^{-1}$, 3600 $cm^{-1}$, 3580 $cm^{-1}$, 511 $cm^{-1}$ and 460 $cm^{-1}$. The ratio of the sum of the surface areas of the peaks at 3687 $cm^{-1}$ and 3600 $cm^{-1}$ to the surface area of the peak at 3580 $cm^{-1}$ was calculated to be 0.121 for sample m. Thus the third criterion of the invention had been satisfied.

The ratio of the surface area of the peak at 511 $cm^{-1}$ to the surface area of the peak at 460 $cm^{-1}$ gave a value of 25.0. Thus the fourth criteria of the invention had not been satisfied.

The intensity of the peaks located at wave numbers 511 $cm^{-1}$ and 460 $cm^{-1}$ was then measured. Calculation of the intensity ratio of the peak at 511 $cm^{-1}$ to the intensity of the peak at 460 $cm^{-1}$ gave a value of 2.35, since 2.35=(0.24× 6)+0.91. This result is shown as point 101 in FIG. 10. This criterion ascertains that the cobalt is uniformly distributed in the nickel hydroxide since y≧0.7 for sample m.

A Ni—Cd storage cell analogous to that of Example 1 but comprising an electrode containing sample m was cycled under the same conditions as those given in Example 1. After stabilizing, the discharged capacity was measured as 277 mAh/g of active material for sample m, corresponding to an exchange of 1.21 electrons per mole of $Ni(OH)_2$.

The discharged capacity was then measured under the following conditions:

charge at 0.05 $C_n$ for 4 hours, then at 0.2 $C_n$ for 5 hours; discharge at 0.33 $C_n$ to an end-point voltage of 1V.

A first measurement was recorded at ambient temperature. A discharged capacity of 268 mAh/g at ambient temperature was obtained. After five cycles under these conditions at a temperature of 40° C., the same capacity measurement was made but at 40° C. and a capacity of 252 mAh/g was obtained at this temperature. The ratio of the efficiency at 40° C. to that at ambient temperature was 94% for sample m. This result showed excellent hot chargeability for sample m of the invention containing cobalt hydroxide syncrystallized with nickel hydroxide and uniformly distributed in its crystalline structure.

Self-discharge of the Ni—Cd storage cell described above containing sample m was determined under the following conditions:

charge at ambient temperature at 0.2 $C_n$ for 5 hours, then at 0.05 $C_n$ for 4 hours;

rest for 7 days at a temperature of 40° C.;

discharge at 0.33 $C_n$ to an end-point voltage of 1 V.

The discharged capacity which was then measured was compared with that measured under analogous conditions without a rest period. The self-discharge calculation gave a value of 18%, showing very good conservation of capacity by sample m of the invention which contained cobalt hydroxide syncrystallized with nickel hydroxide and uniformly distributed in its crystalline structure.

The results are shown in Table III below.

Example 14

A sample n of a nickel-based hydroxide in accordance with the present invention was prepared which contained 3% of cobalt hydroxide and 4% of syncrystallized zinc hydroxide, using a precipitation method which was analogous to that described in Example 2.

The X-ray diffraction diagram of sample n was recorded under the same conditions as those given for Example 1. From this diagram, the relative intensities of the [103] line and the [200] line were measured and the ratio was calculated.

The intensity ratio of the [103] line to the [200] line for sample n was 0.98. The coherence length was 12.0 nm. The crystallite size calculated from the mid-height width of the most intense [101] line was 6.7 nm. Thus the first and second criteria of the invention were satisfied.

The Raman spectrum of sample n was recorded under the same conditions as those given for Example 1 and used to measure the surface areas of the peaks at wave numbers 3687 $cm^{-1}$, 3600 $cm^{-1}$, 3580 $cm^{-1}$, 511 $cm^{-1}$ and 460 $cm^{-1}$. The ratio of the sum of the surface areas of the peaks at 3687 $cm^{-1}$ and 3600 $cm^{-1}$ to the surface area of the peak at 3580 $cm^{-1}$ was calculated to be 0.120 for sample n. Thus the third criterion of the invention was satisfied.

The ratio of the surface area of the peak at 511 $cm^{-1}$ to the surface area of the peak at 460 $cm^{-1}$ gave a value of 1.80. Thus the fourth criterion of the invention was not satisfied.

The intensity of the peaks located at wave numbers 511 $cm^{-1}$ and 460 $cm^{-1}$ was then measured. Calculation of the intensity ratio of the peak at 511 $cm^{-1}$ to the intensity of the peak at 460 $cm^{-1}$ gave a value of 1.6, since 1.6=(0.24×3)+0.88. This result is shown as point 102 in FIG. 10. This criterion ascertains that the cobalt is uniformly distributed in the nickel hydroxide since y≧0.7 for sample n.

A Ni—Cd storage cell analogous to that of Example 1 but comprising an electrode containing sample n was cycled under the same conditions as those given in Example 1. After stabilizing, the discharged capacity was measured as 279 mAh/g of active material for sample n, corresponding to an exchange of 1.19 electrons per mole of Ni(OH)$_2$.

The discharged capacity was then measured under the following conditions:

charge at 0.05 $C_n$ for 4 hours, then at 0.2 $C_n$ for 5 hours;
discharge at 0.33 $C_n$ to an end-point voltage of 1 V.

A first measurement was recorded at ambient temperature. A discharged capacity of 262 mAh/g at ambient temperature was obtained. After five cycles under these conditions at a temperature of 40° C., the same capacity measurement was made but at 40° C. and a capacity of 241 mAh/g was obtained at this temperature. The ratio of the efficiency at 40° C. to that at ambient temperature was 92% for sample n. This result showed excellent hot chargeability for sample n of the invention containing cobalt hydroxide syncrystallized with nickel hydroxide and uniformly distributed in its crystalline structure.

Self-discharge of the Ni—Cd storage cell described above containing sample n was determined under the following conditions:

charge at ambient temperature at 0.2 $C_n$ for 5 hours, then at 0.05 $C_n$ for 4 hours;
rest for 7 days at a temperature of 40° C.;
discharge at 0.33 $C_n$ to an end-point voltage of 1 V.

The discharged capacity which was then measured was compared with that measured under analogous conditions without a rest period. The self-discharge calculation gave a value of 20%, showing good conservation of capacity by sample n of the invention which contained cobalt hydroxide syncrystallized with nickel hydroxide and uniformly distributed in its crystalline structure.

The results are shown in Table III below.

Example 15

A sample p of a nickel-based hydroxide in accordance with the present invention was prepared which contained 3% of cobalt hydroxide and 4% of syncrystallized zinc hydroxide, using a precipitation method which was analogous to that described in Example 2, but modifying the order of introduction of the reactants. About 2000 g of a 4M sodium hydroxide solution was introduced into a reactor which was analogous to that used in Example 1, stirred at a rate of 100 revolutions/minute and held at a constant temperature of 60° C. An aqueous 1M solution of nickel, cobalt and cadmium nitrates in the proportions required to obtain the desired hydroxide was introduced at a constant and continuous rate for a period of 5 minutes. When addition of the solution of nitrates was complete, the solution was stirred and heated constantly for 2 hours to age the hydroxide particles. The precipitate was then filtered, dried, washed, ground and screened as described in Example 1.

The X-ray diffraction diagram of sample p was recorded under the same conditions as those given for Example 1. From this diagram, the relative intensities of the [103] line and the [200] line were measured and the ratio was calculated.

The intensity ratio of the [103] line to the [200] line for sample p was 0.96. The coherence length was 11.8 nm. The crystallite size calculated from the mid-height width of the most intense [101] line was 5.5 nm. Thus the first and second criteria of the invention had been satisfied.

The Raman spectrum of sample p was recorded under the same conditions as those given for Example 1 and used to measure the surface areas of the peaks at wave numbers 3687 $cm^{-1}$, 3600 $cm^{-1}$, 3580 $cm^{-1}$, 511 $cm^{-1}$ and 460 $cm^{-1}$. The ratio of the sum of the surface areas of the peaks at 3687 $cm^{-1}$ and 3600 $cm^{-1}$ to the surface area of the peak at 3580 $cm^{-1}$ was calculated to be 0.110 for sample p. The ratio of the surface area of the peak at 511 $cm^{-1}$ to the surface area of the peak at 460 $cm^{-1}$ gave a value of 0.81. Thus the third and fourth criteria of the invention were satisfied.

The intensity of the peaks located at wave numbers 511 $cm^{-1}$ and 460 $cm^{-1}$ was then measured. Calculation of the intensity ratio of the peak at 511 $cm^{-1}$ to the intensity of the peak at 460 $cm^{-1}$ gave a value of 0.8, since 0.8=(0.24×3)+0.08. This result is shown as point 103 in FIG. 10. This criterion ascertains that the cobalt is uniformly distributed in the nickel hydroxide since y≧0.7 for sample p.

A Ni—Cd storage cell analogous to that of Example 1 but comprising an electrode containing sample p was cycled under the same conditions as those given in Example 1. After stabilizing, the discharged capacity was measured as 282 mAh/g of active material for sample p, corresponding to an exchange of 1.20 electrons per mole of Ni(OH)$_2$.

The discharged capacity was then measured under the conditions given for Example 12. A first measurement was recorded at ambient temperature. A discharged capacity of 265 mAh/g at ambient temperature was obtained. After five cycles under the conditions given for Example 12 at a temperature of 40° C., the same capacity measurement was made but at 40° C. and a capacity of 162 mAh/g was obtained at this temperature. The ratio of the efficiency at 40° C. to that at ambient temperature was 61% for sample p. This result showed poor hot chargeability for sample p of the invention containing cobalt hydroxide syncrystallized with nickel hydroxide and uniformly distributed in its crystalline structure.

Self-discharge of the Ni—Cd storage cell described above containing sample 1 was determined under the conditions described for Example 12. The discharged capacities were then compared under analogous conditions, with and without a rest period. The self-discharge calculation gave a value of 30%, showing poor conservation of capacity by sample p of the invention which contained cobalt hydroxide syncrystallized with nickel hydroxide and uniformly distributed in its crystalline structure.

The results are shown in Table III below.

TABLE III

| REFERENCE | l | m | n | p |
|---|---|---|---|---|
| $M = I_{[103]}/I_{[200]}$ | 0.96 | 0.96 | 0.98 | 0.96 |
| $L = \sqrt[3]{(\Phi_{[100]})^2 \times (\Phi_{[001]})}$ (nm) | 15.0 | 14.6 | 12.0 | 11.8 |
| Crystallite size (nm) from [101] line | 6.2 | 6.3 | 6.7 | 5.5 |
| $S_1 = S_{3600} + S_{3687}/S_{3580}$ | 0.12 | 0.121 | 0.12 | 0.11 |
| $S_2 = S_{511}/S_{460}$ | 1.10 | 2.5 | 1.15 | 0.81 |
| Number of electrons exchanged per mole of $Ni(OH)_2$ | 1.14 | 1.21 | 1.19 | 1.20 |
| Capacity (mAh/g) of positive active material | 275 | 277 | 279 | 288 |
| $y = I_{511}/I_{460} - (x.P)$ | 0.86 | 0.91 | 0.88 | 0.08 |
| Hot chargeability (%) | 85 | 94 | 92 | 61 |
| Self-discharge (%) | 23 | 18 | 20 | 30 |

The present invention can, of course, be varied by the skilled person without departing from the spirit of the invention. In particular, the scope of the invention would not be exceeded by using any three-dimensional conductor support with high porosity to form the electrode which could be incorporated into a storage cell with a positive nickel electrode and an aqueous alkaline electrolyte of any form, such as those based on the following couples: Ni—Cd, Ni—H$_2$, Ni—MH, Ni—Fe, Ni—Zn, etc. . . . .

We claim:

1. A nickel electrode with a non-sintered support for a storage cell containing an alkaline electrolyte, the electrode comprising a porous three-dimensional conductive structure and an electrochemically active material containing particles of a nickel-based hydroxide with a β crystallographic structure, wherein said hydroxide satisfies at least one of the following criteria:

an intensity ratio of the (103) line to the (200) line in an X-ray diffraction diagram generated under Cu(K$_\alpha$) radiation conditions of the hydroxide of 1.05±0.10;

a coherence length L of 13±3 nm, said coherence length L having the formula:

$$L = \sqrt[3]{(\Phi_{[100]})^2 \times (\Phi_{[001]})}$$

where $\Phi_{[100]}$ is the crystallite size calculated from the mid-height width of the (100) line and $\Phi_{[001]}$ is the crystallite size calculated from the mid-height width of the (001) line of the X-ray diffraction diagram of said hydroxide;

a ratio of the sum of the surface areas of the peaks at 3687±10 cm$^{-1}$ and 3600±10 cm$^{-1}$ to the surface area of the peak at 3580±10 cm$^{-1}$ in the Raman spectrum of said hydroxide of 0.11±0.03;

a ratio of the surface area of the peak at 511±10 cm$^{-1}$ to the surface area of the peak at 460±10 cm$^{-1}$ in the Raman spectrum of said hydroxide of 1.1±0.1.

2. An electrode according to claim 1, in which said hydroxide satisfies at least two of said criteria.

3. An electrode according to claim 1, in which said nickel-based hydroxide contains at least one syncrystallized hydroxide of a metal selected from cobalt, cadmium, zinc, calcium, and magnesium.

4. An electrode according to any one of the preceding claims, in which said hydroxide is mainly composed of a nickel hydroxide and contains at least a proportion by weight P, as a % of said hydroxide, of a syncrystallized cobalt hydroxide, said hydroxide further satisfying the following criterion:

a ratio Q of the intensity of the peak at 511±10 cm$^{-1}$ to the intensity of the peak at 460±10 cm$^{-1}$ in the Raman spectrum of said hydroxide which is such that:

Q=xP+y where x=0.24±0.02 and y≧0.7.

5. A storage cell comprising an alkaline electrolyte and a nickel electrode with a non-sintered support, wherein said electrode comprises a porous three-dimensional conductive structure and an electrochemically active material containing particles of a nickel-based hydroxide with a β crystallographic structure, wherein said hydroxide satisfies at least one of the following criteria:

an intensity ratio of the (103) line to the (200) line in an X-ray diffraction diagram generated under Cu(K$_\alpha$) radiation conditions of the hydroxide of 1.05±0.10;

a coherence length L of 13±3 nm, said coherence length L, having the formula:

$$L = \sqrt[3]{(\Phi_{[100]})^2 \times (\Phi_{[001]})}$$

where $\Phi_{[100]}$ is the crystallite size calculated from the mid-height width of the (100) line and $\Phi_{[001]}$ is the crystallite size calculated from the mid-height width of the (001) line of the X-ray diffraction diagram of said hydroxide;

a ratio of the sum of the surface areas of the peaks at 3687±10 cm$^{-1}$ and 3600±10 cm$^{-1}$ to the surface area of the peak at 3580±10 cm$^{-1}$ in the Raman spectrum of said hydroxide of 0.11±0.03;

a ratio of the surface area of the peak at 511±10 cm$^{-1}$ to the surface area of the peak at 460±10 cm$^{-1}$ in the Raman spectrum of said hydroxide of 1.1±0.1.

6. The storage cell according to claim 5, in which said hydroxide satisfies at least two of said criteria.

7. The storage cell according to claim 5, in which said hydroxide contains at least one syncrystallized hydroxide of a metal selected from cobalt, cadmium, zinc, calcium, and magnesium.

8. The storage cell according to claim 5, in which said hydroxide is mainly composed of a nickel hydroxide and contains at least a proportion by weight P, as a % of said hydroxide, of a syncrystallized cobalt hydroxide, said hydroxide further satisfying the following criterion:

a ratio Q of the intensity of the peak at 511±10 cm$^{-1}$ to the intensity of the peak at 460±10 cm$^{-1}$ in the Raman spectrum of said hydroxide which is such that:

Q=xP+y where x=0.24±0.02 and y≧0.7.

9. A battery of storage cells wherein each storage cell comprises an alkaline electrolyte and a nickel electrode with a non-sintered support, each of said nickel electrode comprising a porous three-dimensional conductive structure and an electrochemically active material containing particles of a nickel-based hydroxide with a β crystallographic structure, wherein said hydroxide satisfies at least one of the following criteria:

an intensity ratio of the (103) line to the (200) line in an X-ray diffraction diagram generated under Cu(K$_\alpha$) radiation conditions of the hydroxide of 1.05±0.10;

a coherence length L of 13±3 nm, said coherence length L, having the formula:

$$L = \sqrt[3]{(\Phi_{[100]})^2 \times (\Phi_{[001]})}$$

where $\Phi_{[100]}$ is the crystallite size calculated from the mid-height width of the (100) line and $\Phi_{[001]}$ is the crystallite size calculated from the mid-height width of the (001) line of the X-ray diffraction diagram of said hydroxide;

a ratio of the sum of the surface areas of the peaks at 3687±10 cm$^{-1}$ and 3600±10 cm$^{-1}$ to the surface area of the peak at 3580±10 cm$^{-1}$ in the Raman spectrum of said hydroxide of 0.11±0.03;

a ratio of the surface area of the peak at 511±10 cm$^{-1}$ to the surface area of the peak at 460±10 cm$^{-1}$ in the Raman spectrum of said hydroxide of 1.1±0.1.

10. The battery according to claim 9, in which said hydroxide satisfies at least two of said criteria.

11. The battery according to claim 9, in which said nickel-based hydroxide contains at least one syncrystallized hydroxide of a metal selected from cobalt, cadmium, zinc, calcium and magnesium.

12. The battery according to claim 9, in which said hydroxide is mainly composed of a nickel hydroxide and contains at least a proportion by weight P, as a % of said hydroxide, of a syncrystallized cobalt hydroxide, said hydroxide further satisfying the following criterion:

a ratio Q of the intensity of the peak at 511±10 cm$^{-1}$ to the intensity of the peak at 460±10 cm$^{-1}$ on the Raman spectrum of said hydroxide which is such that:

Q=xP+y where x=0.24±0.02 and y≧0.7.

* * * * *

UNITED STATES PATENT AND TRADEMARK OFFICE
CERTIFICATE OF CORRECTION

PATENT NO.: 5,702,844
DATED: December 30, 1997
INVENTOR(S): Patrick Bernard, Stephane Senyarich, Claudette Audry It is certified that error(s) appears in the above-identified patent and that said Letters Patent is hereby corrected as shown below:

Column 1, after the "Title of the Invention", but before the "Field of the Invention", insert --The Government of the United States of America has rights in this invention pursuant to Cooperative Agreement No. DE-FC02-91CE50336 awarded by the U.S. Department of Energy--.

Signed and Sealed this

Twenty-seventh Day of March, 2001

*Attest:*

NICHOLAS P. GODICI

*Attesting Officer*  Acting Director of the United States Patent and Trademark Office